May 14, 1929.  H. J. KLEHM  1,712,828
SAW GUARD
Filed Feb. 14, 1927
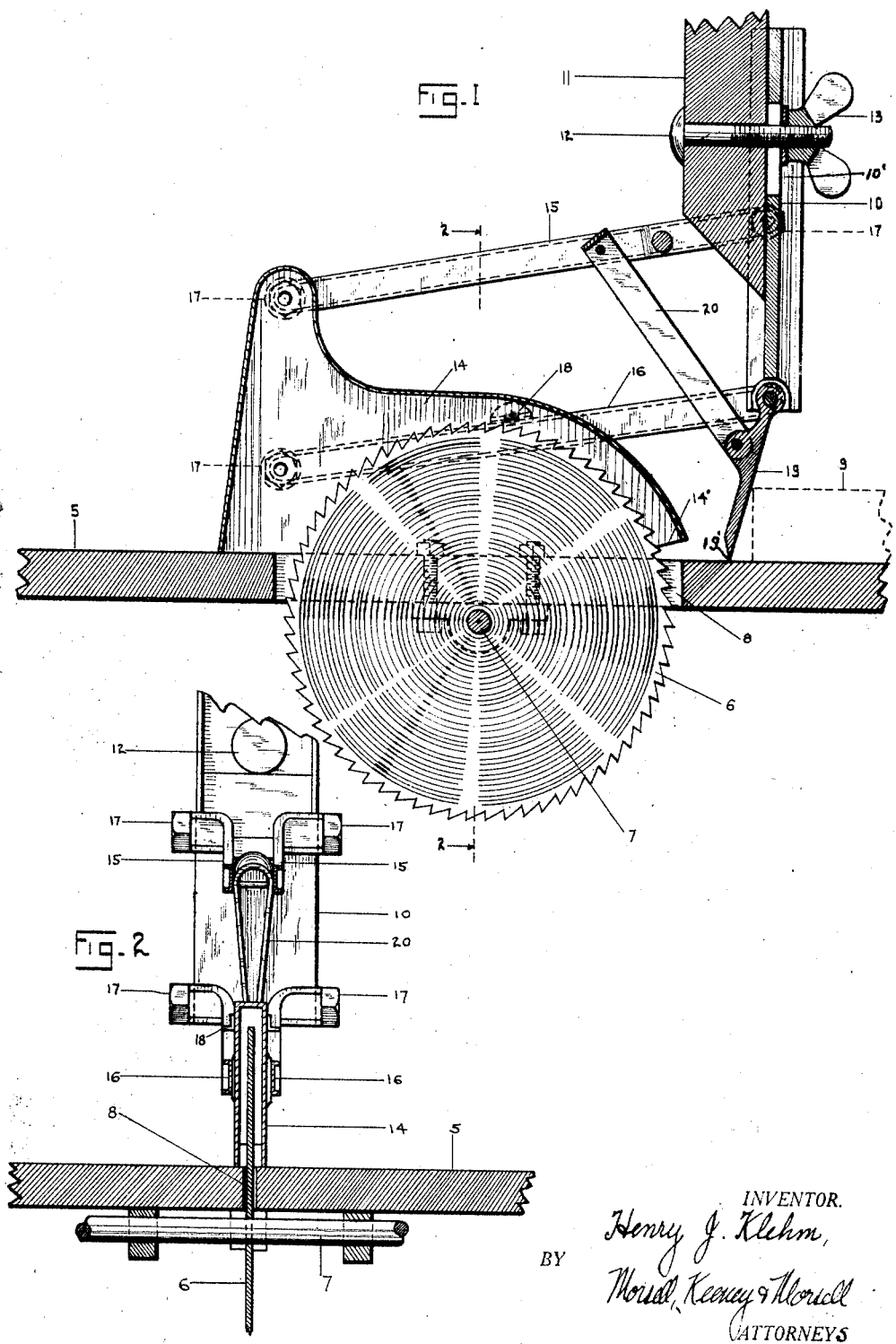
INVENTOR.
Henry J. Klehm,
BY
Morsell, Keeney & Morsell
ATTORNEYS Patented May 14, 1929.

1,712,828

UNITED STATES PATENT OFFICE.

HENRY J. KLEHM, OF SOUTH MILWAUKEE, WISCONSIN.

SAW GUARD.

Application filed February 14, 1927. Serial No. 168,047.

This invention relates to improvements in saw guards.

It is one of the objects of the present invention to provide a saw guard which may be easily attached to an ordinary circular saw for protecting the user against accidental injury.

A further object of the invention is to provide a saw guard in which the saw is only exposed for use when material to be cut is placed in position beneath the guard, and the guard only exposes a portion of the saw sufficient to accommodate the thickness of the material engaged.

A further object of the invention is to provide a saw guard in which the guard member moves in a plane parallel to the plane of the saw table.

A further object of the invention is to provide a saw guard having means for holding the material up to the saw and prevent retrograde movement of the material.

A further object of the invention is to provide a saw guard which is of simple construction, is strong and durable and is well adapted for the purpose described.

With the above and other objects in view the invention consists of the improved saw guard and its parts and combinations as set forth in the claims and all equivalents thereof.

In the accompanying drawing in which the same reference characters indicate the same parts in all of the views:

Fig. 1 is a sectional view of a portion of a circular saw provided with the improved saw guards; the view also indicating by dotted lines a board in position to be engaged by the guard; and Fig. 2 is a transverse sectional view thereof taken on line 2—2 of Fig. 1.

Referring to the drawing the numeral 5 indicates the table and 6 the saw which is mounted on the shaft 7 of a circular saw machine. The shaft is positioned below the table and the saw 6 projects upwardly through a slot 8 in the ordinary manner to permit material 9 to be cut to rest on top of the table and be moved into engagement with the saw. The improved guard comprises a vertically extending I-beam member or plate 10 adapted to be adjustably connected to a depending or other support 11 by a bolt 12 extending through a slot 10' and thumb nut 13. A part circular guard casing 14 is of a sufficient size to enclose the portion of the saw which projects through the table and its lower edge will rest upon the table when in its lowermost position as clearly shown in Fig. 1. The saw casing is connected to the opposite side edges of the attaching plate 10 by pairs of upper and lower links 15 and 16 which are positioned with relation to the casing and the plate in parallelogram formation. The said links are pivotally connected to the casing and the plate by bolts 17 and the plate is positioned in a plane in front of the cutting edge of the saw with the links extending rearwardly therefrom so that the weight of the parts will normally hold the casing bearing upon the table or a slight distance above the material being cut. Stops 18 mounted on the opposite sides of the casing are positioned to engage the upper edges of the lower links 16 to limit the downward movement of the casing. The forward lower edge portion of the casing is beveled as indicated by the numeral 14' so that the material to be cut will easily pass thereunder.

A material engaging dog or member 19 is pivotally connected at its upper end to the lower end of the plate 10 and depends downwardly therefrom at a rearward angle to engage the material to be cut. A U-shaped connecting member 20 is pivotally connected to the rear side of the dog 19 and to the inner sides of the upper links 15 so that when the dog is pushed rearwardly and upwardly by the material to be cut the said movement moves the links and the guard casing upwardly to permit the material to pass beneath the casing. The connecting member 20 is so connected to the dog and the link 15 that the casing will be raised a slight distance greater than the thickness of the material being cut in order not to bear upon said material and thus eliminate friction. The lower end of the dog is beveled to form a sharp edge 19' which engages the upper surface of the material 9 being cut and prevents retrograde movement of said material and holds said material up to the saw for cutting.

From the foregoing description it will be seen that the saw guard is of very simple construction and covers the saw in a manner to eliminate accidents.

What I claim as my invention is:

1. The combination with a table having a circular saw extending therethrough, of a guard therefor, comprising a support, a plate member connected thereto, a casing extending over the saw, links connected to the upper and lower portions of the casing and to the plate member in parallelogram formation, a lever dog pivoted to the plate member and having a connection with one of the links and moved by the material being cut for elevating the casing a sufficient distance above the table to permit the material to pass therebetween, said lever dog being free from connection with the casing.

2. The combination with a table having a circular saw extending therethrough, of a guard therefor, comprising a support, a plate member connected thereto, a casing extending over the saw, pairs of upper and lower links connected to the casing and to the plate member in parallelogram formation, a lever dog having a link connection with some of the links and pivoted to the plate member and depending rearwardly downwardly therefrom for moving the casing upwardly, said lever dog having a sharp lower edge portion which serves to prevent retrograde movement of the material being cut.

3. A saw guard, comprising a plate member having means for connection with a support, a saw casing to the rear of said plate member, a pair of links pivotally connected to the upper portion of the casing and the plate member, a pair of links connected to the lower portion of the casing and the plate member, a lever dog pivotally connected to the plate member and depending downwardly and rearwardly therefrom and free from connection with the saw casing, and a connecting member pivotally connected to a medial portion of the lever dog and to the upper pair of links.

In testimony whereof, I affix my signature.

HENRY J. KLEHM.